United States Patent Office 2,810,238
Patented Oct. 22, 1957

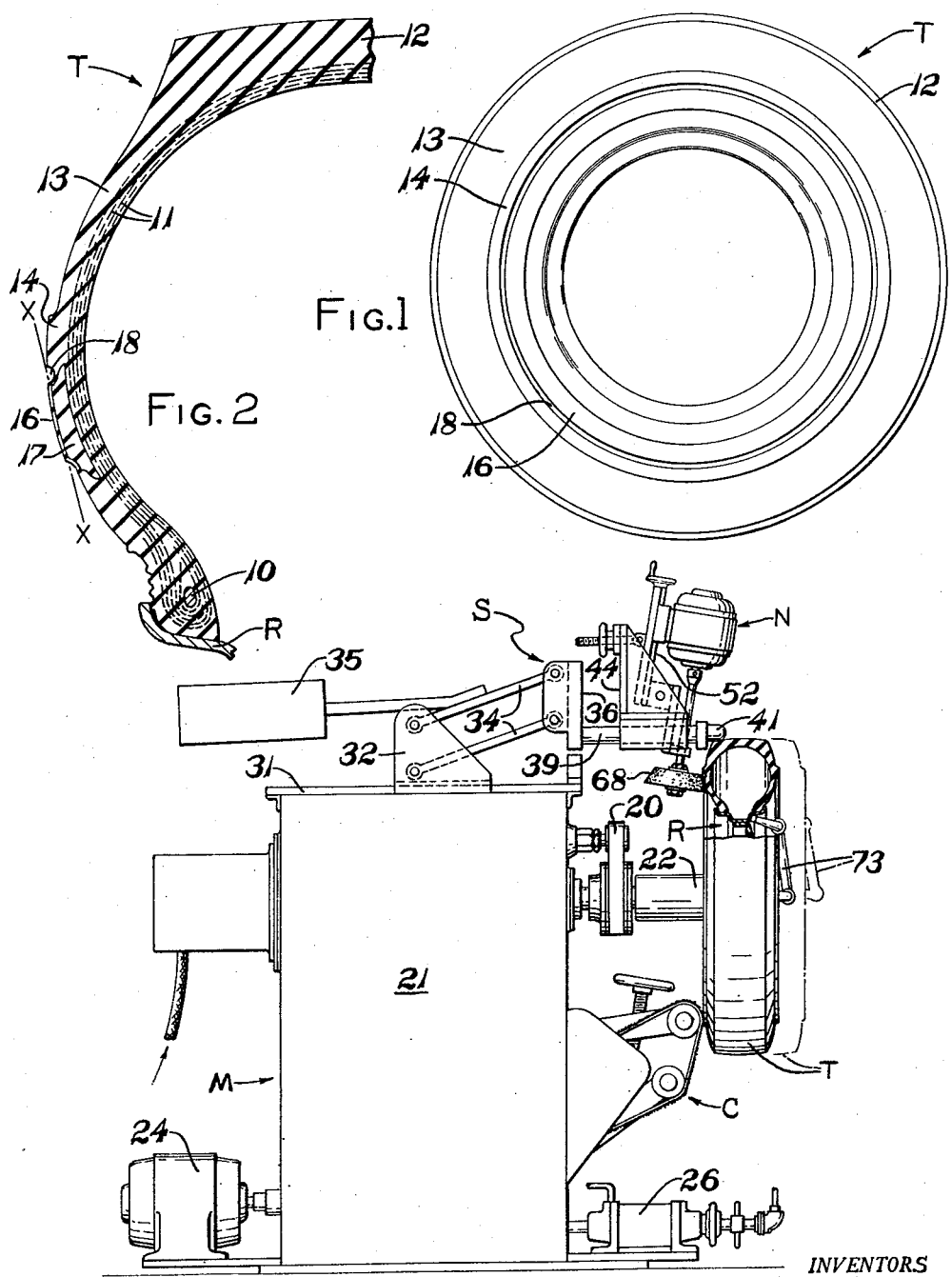

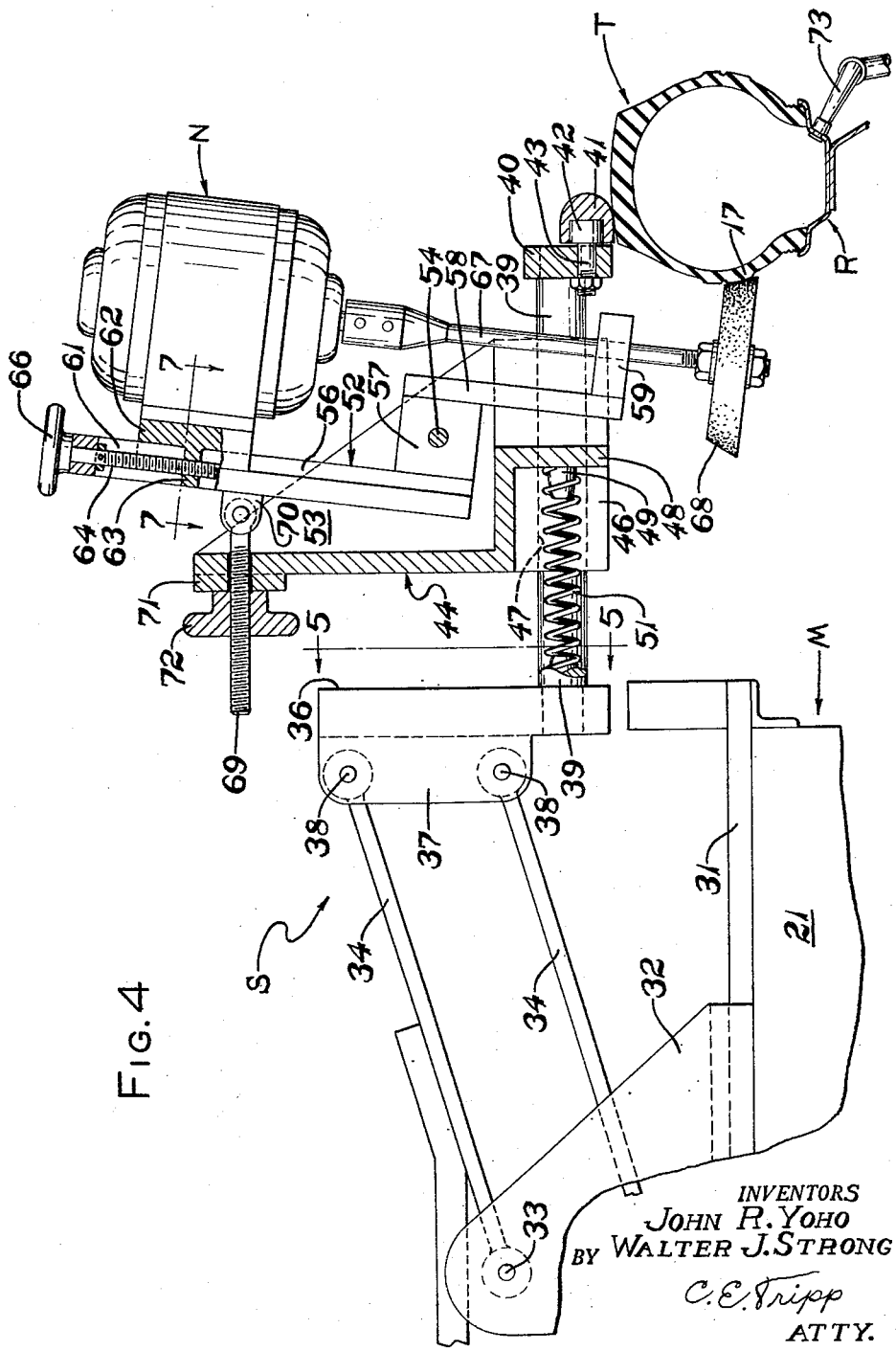

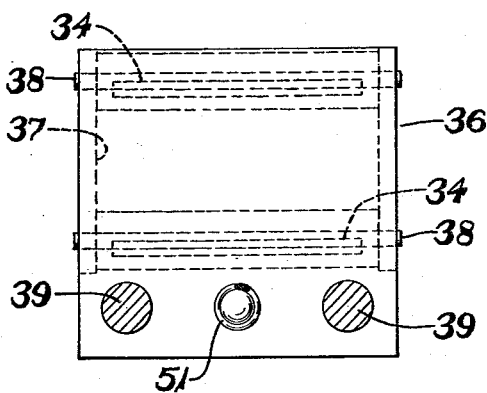
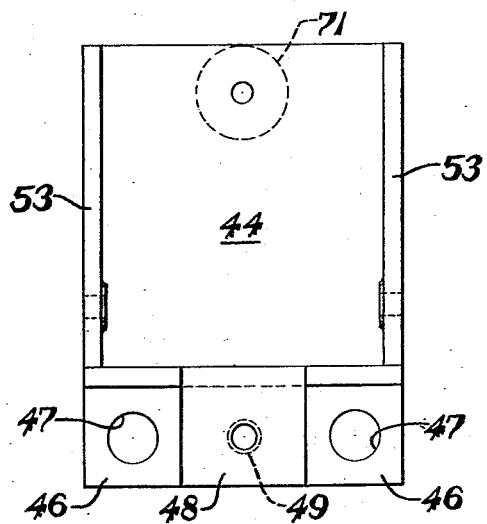
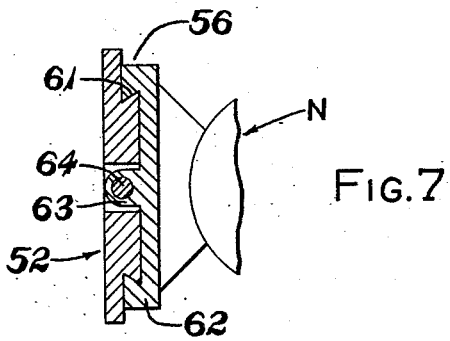

2,810,238

TIRE SIDEWALL FINISHING APPARATUS

John R. Yoho, Akron, and Walter J. Strong, Cuyahoga Falls, Ohio, assignors to The B. F. Goodrich Company, New York, N. Y., a corporation of New York Application December 4, 1956, Serial No. 626,186

3 Claims. (Cl. 51—106)

This invention relates to an apparatus for finishing tires, more specifically to an apparatus for grinding rubber from a rib molded on the sidewall of the tire.

The conventional method of building passenger car tires includes the steps of turning the carcass plies around the bead cores or wires, applying the tread and sidewall rubber, shaping the green tire band into toroidal form, and curing the tire in a mold having the tread and sidewall configurations formed therein. Since there are layers of fabric coated with rubber around the bead cores these cores are not necessarily positively and accurately centered relative to the mold. Thus a molded rib on the sidewall for example may exhibit some radial run out when a tire is mounted on a rim and inflated so that a grinding tool operating on such rib and held in position at a fixed location relative to the axis of rotation of the rim may actually be eccentric relative to the molded rib. On the other hand, such molded ribs are always concentric relative to the other external molded rubber parts such as the periphery of the tire tread, and in accordance with this invention the grinding tool is located by the molded periphery of the tire independent of the axis of rotation of the rim upon which the tire is mounted. This assures that the grinding operation can be performed with precision relative to other molded parts of the tire, and the tool can be brought quite close to such molded parts, such as a curb rib for example, without danger of overlapping the curb rib while maintaining a visually perfectly concentric sidewall appearance. The manner in which these advantages are obtained will be apparent from the following detailed description of a preferred embodiment of the invention.

In the drawings, Fig. 1 is a side view of one type of tire that may be treated with the apparatus of this invention. Fig. 2 is a section of the tire before such treatment. Fig. 3 is a side view of a machine embodying the invention. Fig. 4 is a sectional side view of the apparatus. Fig. 5 is a section taken on 5—5 of Fig. 4. Fig. 6 is a front view of the carriage removed from the machine, and Fig. 7 is a section taken on 7—7 of Fig. 4.

Referring to Figs. 1 and 2, the tire construction shown requires an abrasive operation on the sidewall rib which must be precisely aligned with other external molded parts of the tire such as a curb rib. In the tire shown, tire T has a pair of inextensible bead cores 10 formed by wrapping steel wire or tape into a ring in the usual manner. The tire has the usual carcass plies 11 anchored to the bead cores and has a molded tread 12, which is compounded of carbon black reinforced rubber. The sidewall portion 13 is of the same material and an annular curb or buffing rib 14 of black rubber is closely adjacent to a white sidewall rib 16. The white sidewall portion of the tire is formed by applying a band of white sidewall rubber 17 to the carcass before the black sidewall rubber 13 is applied, so that when the tire is removed from the mold the white sidewall rubber 17 is covered with a layer of black rubber and in the form shown there is a narrow groove 18 left between the white sidewall part and the curb rib 14. The function of the apparatus of this invention in this case is to grind off the black sidewall rubber covering the white rubber 17 along the line x—x, leaving the white sidewall rubber exposed in a manner wherein the exposed rubber is concentric with the buffing rib 14 and with the tread 12.

The operation is performed by mounting the tire on a rim R and inflating it, whereupon the tire is rotated and the grinding apparatus of the invention performs its function. Referring to Figs. 3 to 7, the apparatus S of the invention for finishing the sidewall is mounted on a machine M of the type disclosed in the patent to W. J. Strong, 2,707,851, April 10, 1955, assigned to The B. F. Goodrich Company. This apparatus includes a frame or housing 21 in which is mounted a rotatable spindle 22 for supporting the rim R. The rim and mounted tire can be retracted from a forward, non-operative position shown in dot dash lines shown in Fig. 3, to the rearward, work station position as shown in solid lines in Fig. 3 by means of a fluid motor 23, all as disclosed in the aforesaid patent to Strong. The spindle 22 along with the tire and rim, is rotated by motor 24 by suitable gearing not shown because the details of the rotation arrangement are not part of the invention. A suitable arrangement is shown in the aforesaid patent to Strong. Means for grinding a curb strip 14 of the tire may also be provided in the form of a motor driven belt sanding assembly C, which can be advanced and retracted from the tire by a fluid motor 26, which is a pneumatic piston and cylinder.

Referring to Figs. 4 to 7, the sidewall finishing apparatus is mounted on a base plate 31 attached to the frame 21 of the machine M. A pair of spaced plates 32 extend upwardly from the base plate and mount pivot pins 33 to receive one end of a pair of parallel motion links 34. A carriage support 36 is formed with a pair of ears 37 which are pivoted to the other end of the parallel motion links 34 by means of pins 38. A counter weight 35 is attached to the upper links 34. Projecting forwardly from the carriage support 36 are laterally spaced rods 39, these rods being connected at their outer ends by a bridge plate 40 which plate mounts a guide roller 41 for engaging the tread of the tire. The roller 41 is mounted on a ball bearing 42 which rotates on a stub shaft 43 bolted to the bridge plate 40. The carriage 44 has at its lower end a pair of blocks 46 that are apertured at 47 for free sliding on the forwardly extending rods 39. The carriage has a flange 48 which flange has a boss 49 for receiving one end of a spring 51, the other end of the spring being similarly mounted on a support 36 to urge the carriage forwardly towards the tire T when it is mounted on the machine.

Mounted on the carriage is a motor support member 52 which is pivoted between a pair of side flanges 53 by means of a pivot pin 54. A dove tail guide plate 56 extends upwardly from a pivot block 57 and a downwardly extending plate 58 supports a generally horizontal bearing support 59 for the shaft of a motor N. The dove tail guide or ways 61 are best seen in Fig. 7 and are embraced by a slide 62 which is adjusted up and down along the guide member by means of a threaded lug 63 that receives a screw 64 rotatably mounted on the guide member 52 in a manner that prevents axial motion of the screw, the adjustment being made by means of a hand wheel 66 pinned to the screw.

Shaft 67 of the motor N extends through an anti-friction bearing in the bearing plate 59, and on the end of the shaft is mounted a suitable abrasive wheel 68 contoured for grinding the sidewall portion of the tire T during operation of the machine. The angular position of the motor shaft is adjusted by means of screw 69 pivoted to the motor support at 70 and sliding thru a boss 71 in the carriage. Handwheel 72 is threaded to the screw for making the adjustment.

*Operation*

The machine M will have been operated to advance the spindle 22 by means of fork 20 to its forward position whereupon a tire is mounted on the rim R. The tire is inflated through an air connection 73 the construction shown being arranged for treating tubeless tires so that the inflation valve is in the rim R. The vertical position of the grinding wheel and motor will have been adjusted by manipulating hand wheel 66 so that the grinding wheel is aligned with the white sidewall rib 16 of the tire when the apparatus S is in its operating position. The carriage and its support will have been raised and the counter weight 35 is so arranged that in the raised position of the carriage the force of gravity maintains the carriage in that position. The machine M is then operated to retract the tire to its working position. The carriage is now manually forced away from the tire against spring 51 so that it can be be lowered to cause roller 41 to rest on the periphery of the tire tread. The geometry of the apparatus is such that with the carriage in the lower position there is now a positive gravitational force pressing the roller 41 against the tire tread. The carriage is released to cause the grind wheel to press against the tire under the force of spring 51, so that when the motor is energized the abrasion wheel 68 will grind off the black covering over the white sidewall material 17 of the tire while the tire is rotated by means of sprindle 22. The tire is permitted to rotate through one or more revolutions as required until the skim coat over the white sidewall rubber is ground off exposing the white sidewall rubber 17. The motors are then stopped and the tire is advanced to its forward position when the cycle has been completed.

Since the apparatus is guided by molded external rubber parts of the tire, the abraded portion of the sidewall will be concentric with other molded parts such as the curb rib 14, which will give the tire a good appearance even though the white sidewall band may be quite close to the buffing rib. The angular adjustment of the mold and abrasion wheel by means of hand wheel 72 makes it possible for the abrasive wheel to be tangent to the contour of the sidewall which it engages.

Having completed a description of a preferred embodiment of the invention, we claim:

1. Apparatus for precision abrading a sidewall element of a cured tire comprising a frame, a tire rim, means rotatably mounting said rim on said frame, means for rotating said rim, a support mounted on said frame for motion in a direction substantially perpendicular to the axis of said rim, a carriage mounted on said support for motion substantially parallel to the axis of rotation of said rim, an abrasive member mounted on said carriage for grinding the sidewall of a tire mounted on said rim, means for rotating said abrasive member, a guide member on said carriage support for engaging the tread of a tire mounted on said rim to maintain said abrasive wheel concentric with the tread of the tire, means for pressing said guide member against the tire tread, and means for pressing said abrasive member against the tire sidewall.

2. Apparatus for abrading a rib moulded on the sidewall of a tire comprising a frame, a tire rim, means rotatably mounting said rim on said frame, means for rotating said rim, a support mounted on said frame for motion in a direction substantially perpendicular to the axis of said rim, a carriage mounted on said support for motion substantially parallel to the axis of rotation of said rim, a motor support member mounted on said carriage for pivotal motion about an axis perpendicular to the direction of motion of said support and said carriage, a motor on said motor support, an abrasive wheel driven by said motor for grinding the sidewall of a tire mounted on said rim, means for adjusting the angular position of said motor support member relative to said carriage, a guide member on said carriage support for engaging the tread of a tire mounted on said rim to maintain said abrasive wheel concentric with the tread of the tire, means for pressing said guide member against the tire tread, and means for pressing said abrasive member against the tire sidewall.

3. Apparatus for abrading a rib moulded on the sidewall of a tire comprising a frame, a tire rim, means rotatably mounting said rim on said frame, means for rotating said rim, parallel motion linkage pivotally mounted on said frame, a support mounted on said linkage for motion in a direction substantially perpendicular to the axis of said rim, a carriage mounted on said support for motion substantially parallel to the axis of rotation of said rim, a motor support member mounted on said carriage for pivotal motion about an axis perpendicular to the direction of motion of said support and said carriage, a motor on said motor support, an abrasive wheel driven by said motor for grinding the sidewall of a tire mounted on said rim, means for adjusting the angular position of said motor support member relative to said carriage, a guide member on said carriage support for engaging the tread of a tire mounted on said rim to maintain said abrasive wheel concentric with the tread of the tire, means for pressing said abrasive wheel against the tire sidewall, the weight of said support, a carriage and motor parts pressing said guide member against the tire sidewall.

References Cited in the file of this patent

UNITED STATES PATENTS

| | | |
|---|---|---|
| 821,621 | Dunn | May 29, 1906 |
| 1,886,859 | Wright | Nov. 8, 1932 |